United States Patent
Kreis

(10) Patent No.: US 6,831,666 B1
(45) Date of Patent: Dec. 14, 2004

(54) APPLICATION SELECTION WINDOW IN A WINDOWS OPERATION SYSTEM

(75) Inventor: Alexander T. Kreis, Mountain View, CA (US)

(73) Assignee: Canon Kabushiki Kaisha, Tokyo (JP)

(*) Notice: Subject to any disclaimer, the term of this patent is extended or adjusted under 35 U.S.C. 154(b) by 576 days.

(21) Appl. No.: 09/594,444

(22) Filed: Jun. 14, 2000

(51) Int. Cl.⁷ .............................................. G09G 5/00
(52) U.S. Cl. ................... 345/781; 345/767; 345/789; 345/791; 345/793; 345/796; 345/802; 345/803; 345/804; 345/805
(58) Field of Search ............................ 345/767, 783, 345/781, 789, 790–791, 793–794, 796–797, 802, 803, 804, 805, 806, 807

(56) References Cited

U.S. PATENT DOCUMENTS

| | | | | |
|---|---|---|---|---|
| 5,412,775 A | * | 5/1995 | Maeda et al. ............... | 345/797 |
| 5,469,540 A | * | 11/1995 | Powers, III et al. ..... | 715/500.1 |
| 5,602,996 A | * | 2/1997 | Powers, III et al. ........ | 345/807 |
| 5,883,626 A | * | 3/1999 | Glaser et al. ............... | 345/788 |
| 5,892,511 A | * | 4/1999 | Gelsinger et al. ........... | 345/794 |
| 6,025,841 A | * | 2/2000 | Finkelstein et al. ......... | 345/803 |

* cited by examiner

*Primary Examiner*—John Cabeca
*Assistant Examiner*—Cuong T. Thai
(74) *Attorney, Agent, or Firm*—Fitzpatrick, Cella, Harper & Scinto

(57) ABSTRACT

Computer system 10 advances application programs from available status to active status. Operating system 12A manages a stack of windows, one for each application running on the system. Availability roster 12A maintains a roster of the application programs which have available status. Display monitor 14 displays the stack of application windows, one of which is an active window which is displayed at the forefront of the stack. The monitor also displays a selection window floating in front of the active window, containing task switch 14T menu of applications for selection. Activation symbols are generated which represent the available application programs and are displayed on the monitor within the task switch. Input device 18D permits the user to select a program for advancement from available status to active status. The selected program is advanced to active status at the forefront of the display stack directly behind the floating selection window.

24 Claims, 3 Drawing Sheets

… Wn, selection window 14S, and task switch window 14T;

APPLICATION SELECTION WINDOW IN A WINDOWS OPERATION SYSTEM

TECHNICAL FIELD

This invention relates to selecting an application program in a windows type operating system, and more particularly to such a selection executed through a floating selection window displayed on the system monitor.

BACKGROUND

Users must change the running applications in order to change the active task appearing at the forefront window on the monitor. For changing programs within operating systems such as Windows 95 or Windows 98 or NT 4.0, a series of user keystrokes (or clicks) was required based on memorized cumbersome procedures. For example the NT 4.0 system offers various procedures to change between applications including the following four procedures:

1) Click on the appropriate taskbar button to bring the desired application to the forefront position. The taskbar must remain visible to the user on the screen. The taskbar may be covered by an active front application which has been "maximized" and occupies the entire screen.

2) Press ALT-ESC to progress (round-robin) through all applications currently running. Multiple running applications require multiple ALT-ESC stroke sequences to cycle through the application windows. The user typically does not keep a mental count of know how many applications are running which causes uncertainties in the cycling.

3) Press ALT-TAB to display a small icon list (horizontal row) of running application, and chose the desired application by multiple ALT-TAB stroke sequences. The boxed (or highlighted) icon in the list is the one under consideration. Each ALT-TAB stroke sequence moves the box one icon to the right. The uncertain cycling difficulty of Procedure 2 is eliminated because the number of running applications is clearly shown in the icon list. However, this procedure requires the user to mentally participate, to closely observe the icon list, and to be familiar with the various icons.

4) Bring up the NT Task Manager application, chose an application tab, and double click on any running application in the list to bring that application to the active position at the front of the screen. The numerous strokes required in this procedure is burdensome.

SUMMARY

It is therefore an object of this invention to provide a selection window for advancing available applications to active status at the forefront position which is faster, requiring fewer user keystrokes (or clicks).

It is another object of this invention to provide such a selection window in which both the applications available for selection and switching procedures are intuitively apparent to the user. Prior program changing procedures required the user to remember initial keystrokes to bring up menus or cycle through applications. The labyrinth prior of key strokes was not self apparent in either operation or effect.

It is a further object of this invention to provide such a selection window which indicates status changes in available applications. A task switch within the selection window contains activation symbols representing the applications available for advancement. As the number of available applications increases (or decreases) the task switch expands (or contracts) to include more (or fewer) symbols. Further, the image format of activation symbols indicate the status of the applications, giving the user valuable status information. This format may change to indicate a corresponding change in status. The symbols may indicate (and update) active status, running status, in-RAM storage status, off-RAM storage status, etc.

It is a further object of this invention to provide such a selection window in which available applications are presented in groups. The activation symbols are arranged within the selection window by user task defining user activity groups. Alternatively, the group presentation may be arranged by status.

It is a further object of this invention to provide such a selection window in which available applications may be accessed from various storage mediums. The applications may be immediately available from close storage such as a system RAM; or remote storage such as a hard drive or Internet sources.

It is a further object of this invention to provide such a selection window in which the task switch may be relocated within the monitor screen.

It is a further object of this invention to provide such a selection window in which the task switch is dedicated to a floating position. The task switch is not covered (occulted) by any of the application windows.

It is a further object of this invention to provide such a selection window in which the task switch is dedicated to an active status.

Briefly, these and other objects of the present invention are accomplished by providing a computer system for advancing application programs from available status to active status. A multi-application windows type operating system simultaneously runs multiple applications. An availability roster maintains a roster of the applications which have available status and are available for advancement to active status. A display monitor responsive to the operating system, displays a stack of application windows having one window for each application which is currently running on the operating system. The monitor displays an active window at the forefront of the window stack for the window of the presently active application, and displays a selection window floating in front of the active window. A symbol generator responsive to the availability roster generates activation symbols representing at least a portion of the available applications for display in the floating selection window on the monitor. An input device permits a user to select available applications for advancement from available status to active status through the activation symbols displayed in the floating selection window. An application advancer responsive to the input device selection advances the selected applications to active status at the forefront of the display stack directly behind the floating selection window.

BRIEF DESCRIPTION OF THE DRAWINGS

Further objects and advantages of the present computer system and the operation of application advancing will become apparent from the following detailed description and drawings (not drawn to scale) in which.

Figure 1:
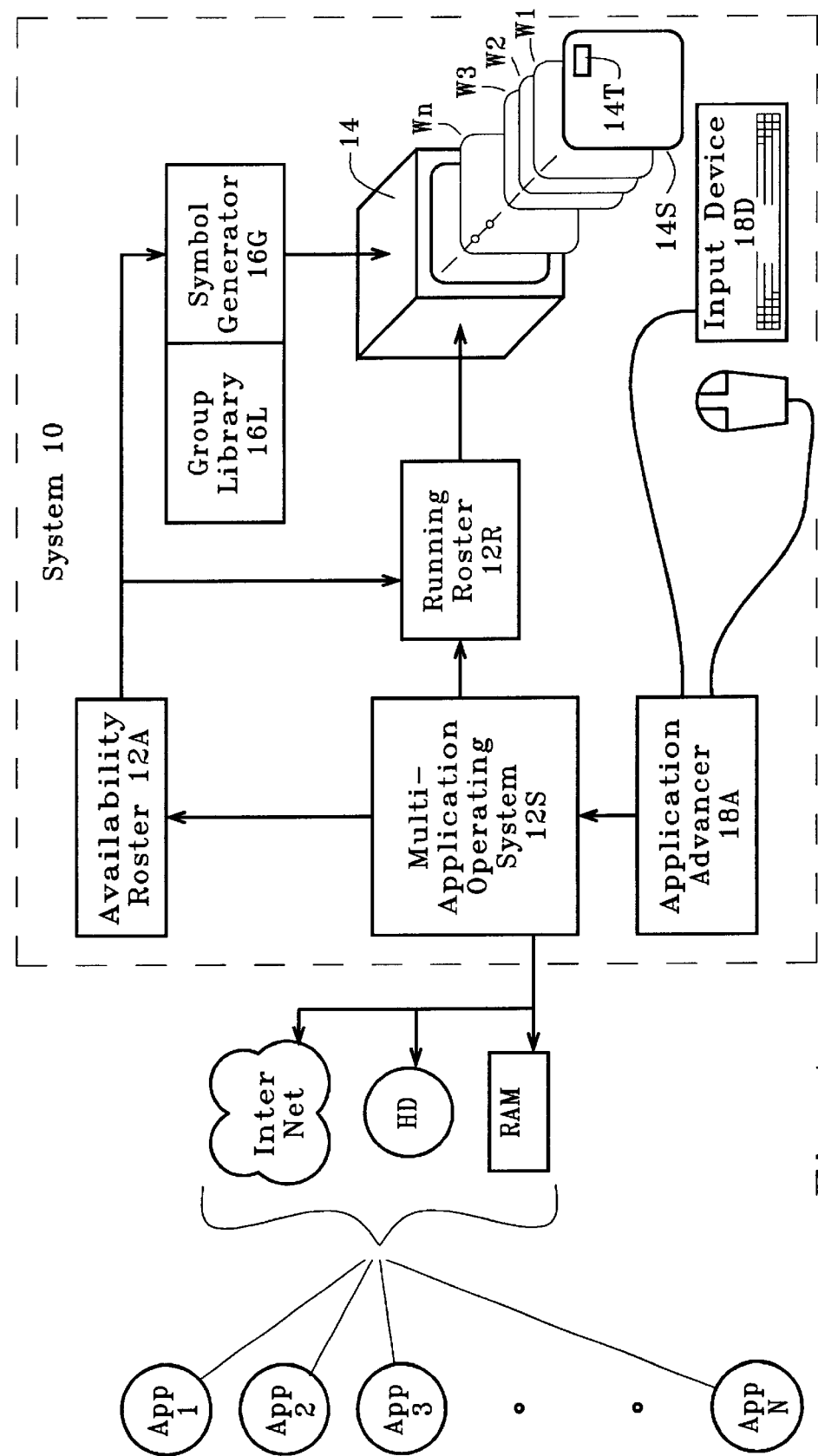
FIG. 1 is a block diagram of computer system 10 with monitor 14 displaying window stack W1, W2, W3 … Wn, selection window 14S, and task switch window 14T.

The first digit of each reference numeral in the above figures indicates the figure in which an element or feature is most prominently shown. The second digit indicates related elements or features, and a final letter (when used) indicates a sub-portion of an element or feature.

REFERENCE NUMERALS IN DRAWINGS

The table below lists the reference numerals employed in the figures, and identifies the element designated by each numeral.

| 10  |     | Computer System 10       |
|-----|-----|--------------------------|
|     | 12A | Availability Roster 12A  |
|     | 12R | Running Roster 12R       |
|     | 12S | Operating System 12S     |
| 14  |     | Display Monitor 14       |
|     | 14S | Selection Window 14S     |
|     | 14T | Task Switch 14T          |
|     | 16G | Symbol Generator 16G     |
|     | 16L | Group Library 16L        |
|     | 18A | Application Advancer 18A |
|     | 18D | Input Device 18D         |

SYSTEM EMBODIMENT

Block Diagram (FIG. 1)

Computer system 10 advances application programs 1-N from available status to active status. Multi-application windows type operating system 12A is capable of simultaneously running multiple application programs. These operating systems have a graphical user interface (GUI) employing a stack of windows, typically one for each application running on the system. The active window is positioned at the forefront of the stack, with the other windows buried within the stack under the active window. Each window may be "opened" and "closed" and permit the user to "look" into the application.

Availability roster 12A maintains a roster of the application programs which have available status; that is, they are available for advancement to active status. Roster 12A may operate on an active basis searching out the availability of programs stored within the computer system and in external storage devices. Alternatively, the roster may merely accept availability status information generated through the operating system. The content of the roster may be user configured, wholly or in part.

Display monitor 14 is responsive to the operating system, for displaying a stack of application windows W1, W2, W3 ... Wn. The stack has one window for each application program currently running on the operating system. Window W1 displayed at the forefront of the stack is an active window for the presently active application program. The monitor also displays selection window 14S floating in front of active window W1, containing task switch 14T menu of applications for selection. The selection window is a full size application window, even though the task switch typically occupies only a small portion of the window. The selection window is preferably permanently dedicated to this floating position. The window stack is managed by the operating system, for performing such matters as starting and stopping applications, determining the stack order of applications, opening and closing windows, etc.

Symbol generator 16G is responsive to availability roster 12A for generating activation symbols which represent at least a portion of the available application programs. These activation symbols are displayed on the monitor within task switch 14T of floating selection window 14S. The symbols may be any form of representation such as alpha-numeric text, icons, and graphics.

Input device 18D permits the user to execute a selection from the available application programs for advancement from available status to active status. The input device may be any suitable user device such as a keyboard, a mouse, a touch display or speech recognition application. In the case of the mouse, the monitor curser is "clicked on" the activation symbols displayed in the floating selection window. The floating selection window is preferably dedicated to a permanent active status in which the activation symbols within the task switch are always responsive to the input device.

Application advancer 18A is responsive to the input device selection for advancing the selected application programs. The selected program is advanced to active status at the forefront of the display stack directly behind the floating selection window.

Application programs that have available status may be accessed by the operating system through the selection window for advancement to active status. These programs may be located in-RAM within the computer system or stored outside the system. Available programs include more than just those programs that happen to be currently running on the operating system at the time. One of the running programs has active status, and the window to that program has been advanced to the front of the window stack. The window to prior active programs are buried in the stack under the present active window. Windows for currently running programs have a position in the interior of the window stack. When a currently running program is advanced to active status, the window for that program is advanced (moved) from interior of window stack to the forefront position.

IN-RAM Available Status

Figure 2A:
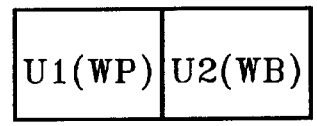
FIG. 2A is a diagram of a task switch illustrating a user configuration mode of displaying activation symbols.

The available application programs may be from a system RAM (or other cache memory) within the computer system. Such RAM stored programs have in-RAM availability status, and respond instantaneously to system instructions within the speed limits of computer system. Running roster 12R maintains a roster of the in-RAM available application programs which are currently running on the operating system. The activation symbol representing each of the currently running programs may be displayed in task switch within the selection window (see FIG. 2A Running Mode).

OFF-RAM Available Status

Figure 2B:
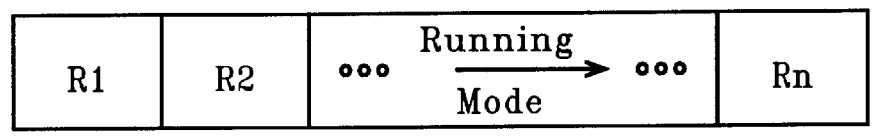
FIG. 2B is a diagram of a task switch illustrating a running mode of displaying activation symbols.
Figure 2C:
FIG. 2C is a diagram of a task switch illustrating an available mode of displaying activation symbols.
Figure 2D:
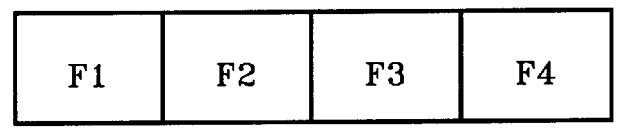
FIG. 2D is a diagram of a task switch illustrating a single group mode of displaying activation symbols.

Some of the available application programs are from a system RAM and have in-RAM availability status; and others of the available application programs are from other storage and have off-RAM or other-storage availability status. The other-storage status may includes any suitable storage mechanism such as a hard drive, tape, or Internet sources. Remote programs from the Internet (the web) are typically installed (downloaded) to a local hard drive. Such off-RAM storage outside system 10 has a slower response due to the access and transfer times required. This other-storage status may become in-RAM status by loading the programs from other storage into a system RAM. Both the in-RAM status programs and the other-storage status programs are available for advancement and may appear in availability roster 12A. The activation symbols representing the available programs may be displayed in task switch within the selection window (see FIG. 2B Available Mode).

The activation symbol representing each of the available application programs may indicate whether that program is actually running, or has in-RAM status and is available for running, or has other-storage status and is available for loading and running. These symbols may change to reflect changes in status. These status indications may be any suitable visual (or audio) cue in the symbol (or background), such as blinking, or change in color or intensity, or a change in the symbol font.

As additional programs become currently running and are added to running roster 12R, the activation symbol for each of these additional running programs may be displayed in the task switch along with the other applications in the roster. Likewise, as new programs become available and are added to availability roster 12A, their activation symbols may also be displayed in the task switch. That is, the task switch may expand spontaneously during operation to include more symbols (see FIGS. 2A and 2B). As running programs are closed (ended), and available applications become non-available, their activation symbols are deleted from the selection window, causing the task switch to spontaneously contract.

MODES OF DISPLAY

Diagrams (FIGS. 2A, 2B, 2C, 2D, 2E)

The mode of display of the task switch activation symbols maybe in any suitable manner in any suitable format, such as the modes presented below. The mode of symbol display maybe a user configuration mode (see FIG. 2A) in which the user establishes which activation symbols are displayed in the selection window. The user selects the activation symbols to be displayed and the order of display. In the FIG. 2A example, the user has two applications running on the operating system, a word processing application U1(WP) and a web browser application U2(WB). The user may easily switch between these two applications while preparing a report on competitor's web sites.

The display mode may be a run mode (see FIG. 2B) in which the activation symbols for all of the application programs running are displayed in the selection window. In the FIG. 2B example, the running applications are R1, R2 . . . Rn. Alternatively, the display mode may be an available mode (see FIG. 2C) in which the activation symbols for all of the available application programs are displayed in the selection window. In the FIG. 2C example, the available applications are Av1, Av2 . . . Avn.

Groups of Related Applications

The available application programs may form a group of applications which are related in some aspect, or the applications may be totally unrelated. Related application programs may relate to the same user activity and define a user activity group. These relating programs may be used together in a common user activity such as financial matters which may involve for example a check writing/balancing application (Quicken) and a federal/state tax application (Turbo Tax) and a budget spread sheet application (Excel).

The display mode may be a group mode (see FIG. 2D) in which the activation symbols for all of the application programs in the group of the presently active program may be displayed in the selection window. When one of the relating programs is running, the activation symbol for each program of the user activity group may be displayed in the selection window. The FIG. 2D example group includes application members F1, F2, F3 and F4, relating to a financial activity. The user can see the symbols for the entire group at one glance.

Figure 2E:
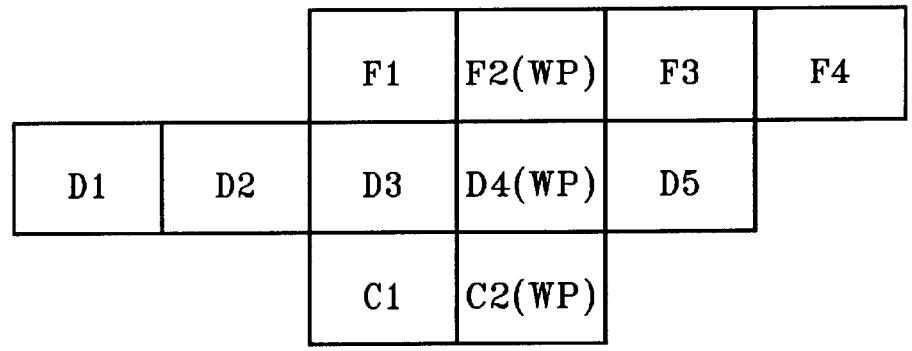
FIG. 2E is a diagram of a task switch illustrating a plural group mode of displaying activation symbols.

The available application programs may form a plurality of groups which relate to a plurality of user activities defining a plurality of user activity groups. The FIG. 2E example includes three groups of relating applications. Group F includes applications F1, F2(WP), F3 and F4, which relate to the above financial activity. Group D includes applications D1, D2, D3, D4(WP) and D5, which relate to a database activity. Group C includes applications C1 and C2(WP), which relate to a correspondence activity. Some of the available application programs may relate to more than one user activity and may be a member of more than one group. Applications F2(WP) of Group F and D4(WP) of Group D and C2(WP) of Group C are the same word processing application with membership in all three groups. Group library 16L may store membership information for the groups for display in the selection window. The group library may also store the activation symbol for each program. When one of the relating programs within a group is running, the activation symbol for each program in all groups of which the running program is a member, may be displayed in the selection window, as shown in FIG. 2E.

METHOD OF USER ADVANCE (FIG. 3)

Figure 3:
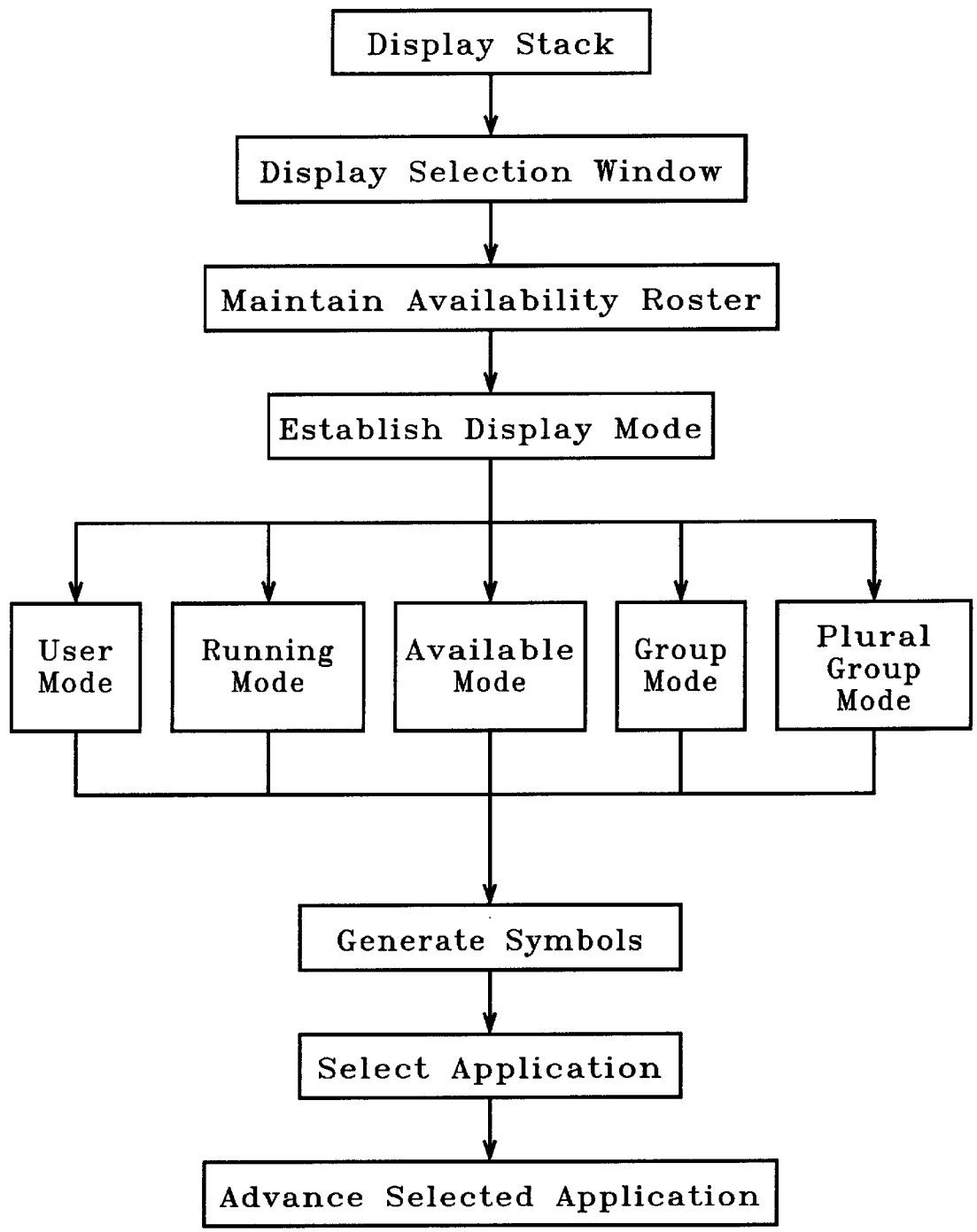
FIG. 3 is a flow chart showing the steps in the general method of advancing applications.

The steps of the general method of permitting a user to advance any application program within a Group of N applications from available status to active status, are summarized below and shown in the flow chart of FIG. 3. This method involves a multi-application windows type operating system capable of simultaneously running multiple application programs. The apparatus required for carrying out the above method of operation is disclosed in connection with the detailed description of the System Embodiment (FIG. 1).

Displaying a stack of application windows on a display monitor. The stack has one window for each application program which is currently running on the operating system. One window of which is an active window at the forefront of the window stack for the presently active application program.

Displaying a selection window on a display monitor. The selection window may be dedicated to a permanent active status and a permanent floating position in front of the active window.

Maintaining an availability roster of the application programs which have available status and are available for advancement to active status.

Generating activation symbols in response to the availability roster representing at least a portion of the available application programs for display in the floating selection window on the monitor. These activation symbols are responsive to user input device 18D for permitting a user to execute a program selection for advancement through the activation symbols displayed.

Selecting an available application program for advancement using the input device.

Advancing the selected application program to active status at the forefront of the display stack directly behind the floating selection window in response to the input device selection.

The above steps of user advancing may include the following additional step.

Establishing a mode of displaying the activation symbols in the selection window. The mode of symbol display may be a user configuration mode in which the user establishes which activation symbols are displayed in the selection window (see FIG. 2A). The display mode may be a run mode in which the symbols for all of the applications running are displayed (see FIG. 2B). The display mode may be an available mode in which the symbols for all of the available applications are displayed (see FIG. 2C). The display mode may be a single group mode in which the symbols for all of the applications in the group of the presently active program are displayed (see FIG. 2D). The display mode may be a plural group mode in which the symbols for all of the applications in all of the groups relating to the presently active application are displayed (see FIG. 2E).

Further, the features of this invention may be incorporated into a suitable computer readable medium containing a computer program that advances application programs from available status to active status.

CONCLUSION

It will be apparent to those skilled in the art that the objects of this invention have been achieved as described hereinbefore.

Clearly various changes may be made in the structure and embodiments shown herein without departing from the concept of the invention. Further, features of the embodiments shown in the various figures may be employed with the embodiments shown in the other figures.

Therefore, the scope of the invention is to be determined by the terminology of the following claims and the legal equivalents thereof.

I claim:

1. A computer system for advancing application programs from available status to active status, comprising:

a multi-application windows type operating system capable of simultaneously running multiple application programs;

availability roster for maintaining a roster of the application programs which have available status and are available for advancement to active status;

display monitor responsive to the operating system, for displaying a stack of application windows having one window for each application program which is currently running on the operating system, for displaying an active window at the forefront of the stack of application windows of the presently active application program, and for displaying a selection window floating in front of the active window;

symbol generator responsive to the availability roster for generating activation symbols representing at least a portion of the available application programs the generated activation symbols being displayed in the floating selection window on the monitor;

input device for permitting a user to select available application programs for advancement from available status to active status through the activation symbols displayed in the floating selection window; and application advancer responsive to the input device selection for advancing the selected application programs to active status at the forefront of the stack of application windows directly behind the floating selection window, wherein the floating selection window is dedicated by the operating system to a permanent floating position just in front of the active window and is dedicated by the operating system to a permanent active status in which the activation symbols are always responsive to the input device.

2. The system for advancing of claim 1, wherein the available application programs are from a RAM and have an in-RAM availability status.

3. The system for advancing of claim 2, further comprising a running roster for maintaining a roster of the in-RAM available application programs which are currently running on the operating system.

4. The system for advancing of claim 3, wherein the activation symbol representing each of the currently running programs is displayed in the selection window.

5. The system for advancing of claim 4, wherein as additional programs become currently running and are added to the running roster, the activation symbol representing each of these additional running programs is displayed in the selection window.

6. The system for advancing of claim 3, wherein the activation symbol representing each of the available application programs displayed in the selection window, indicates whether that program is actually running or merely available for running.

7. The system for advancing of claim 3, wherein:

some of the available application programs are from a RAM and have in-RAM availability status;

others of the available application programs are from other storage and have other-storage availability status, which other-storage status for an available application program may become in-RAM status by loading that program from other storage into a RAM; and both the in-RAM status programs and the other-storage status programs are available for advancement and appear in the availability roster.

8. The system for advancing of claim 7, wherein as additional programs become currently running or become available for running, the activation symbol representing each of these additional programs is displayed in the selection window.

9. The system for advancing of claim 7, wherein the activation symbol representing each of the available application programs indicates whether that program is actually running or has in-RAM status and is available for running or has other-storage status and is available for running.

10. A computer apparatus for advancing application programs from available status to active status, comprising:

a multi-application windows type operating system capable of simultaneously running multiple application programs and displaying a stack of application windows on a display monitor, the stack having one window for each application program which is currently running on the operating system, one window of which is an active window at the forefront of the stack of application windows for the presently active application program, and displaying a selection window which is dedicated by the operating system to a permanent active status and dedicated by the operating system to a permanent floating position in front of the active window;

availability roster for maintaining a roster of the application programs which have available status and are available for advancement to active status;

symbol generator responsive to the availability roster for generating activation symbols representing at least a portion of the available application programs, the generated activation symbols being displayed in the floating selection window on the monitor, which activation symbols are responsive to an input device for permitting a user to select available application programs for advancement from available status to active status through the activation symbols displayed in the floating selection window; and application advancer responsive to the input device selection for advancing the selected application programs to active status at the forefront of the stack of application windows directly behind the floating selection window.

11. The apparatus for advancing of claim 10, wherein the available application programs form a group of N available programs.

12. The apparatus for advancing of claim 11, wherein the group of N available programs relate to the same user activity defining a user activity group.

13. The apparatus for advancing of claim 12, wherein when one of the relating programs is running, the activation symbol representing each program of the user activity group is displayed in the selection window.

14. The apparatus for advancing of claim 10, wherein the available application programs form a plurality of groups of available programs which relate to a plurality of user activities defining a plurality of user activity groups.

15. The apparatus for advancing of claim 14, wherein the available application programs may relate to more than one user activity and may be a member of more than one group.

16. The apparatus for advancing of claim 15, further comprising a group library for storing membership information for the groups.

17. The apparatus for advancing of claim 15, wherein when one of the relating programs within a group is running, the activation symbol representing each program of the group or groups in which the running program is a member, is displayed in the selection window.

18. A method of permitting a user to advance any application program within a Group of N applications from available status to active status, using a multi-application windows type operating system capable of simultaneously running multiple application programs, comprising the steps of:

displaying a stack of application windows on a display monitor, the stack having one window for each application program which is currently running on the operating system, one window of which is an active window at the forefront of the stack of application windows for the presently active application program;

displaying a selection window on a display monitor, which selection window is dedicated by the operating system to a permanent active status and dedicated by the operating system to a permanent floating position in front of the active window;

maintaining an availability roster of the application programs which have available status and are available for advancement to active status;

generating activation symbols in response to the availability roster for at least a portion of the available application programs, the generated activation symbols being displayed in the floating selection window on the monitor, which activation symbols are responsive to a user input device;

selecting an available application program using the input device, for advancement from available status to active status through the activation symbols displayed in the floating selection window; and advancing the selected application program to active status at the forefront of the stack of application windows directly behind the floating selection window in response to the input device selection.

19. The method of claim 18, further comprising the additional step of establishing a mode of displaying the activation symbols in the selection window.

20. The method of claim 19, wherein the mode of activation symbol display is a user configuration mode in which the user establishes which activation symbols are displayed in the selection window.

21. The method of claim 19, wherein the mode of activation symbol display is a run mode in which the activation symbols for all of the application programs running are displayed in the selection window.

22. The method of claim 19, wherein the mode of activation symbol display is an available run mode in which the activation symbols for all of the available application programs are displayed in the selection window.

23. The method of claim 19, wherein the mode of activation symbol display is a group mode in which the activation symbols for all of the application programs in the group of the presently active program are displayed in the selection window.

24. A computer readable medium containing a computer program that advances application programs within a Group of N applications from available status to active status, by directing a multi-application windows type operating system capable of simultaneously running multiple application programs to execute the steps of:

displaying a stack of application windows on a display monitor, the stack having one window for each application program which is currently running on the operating system, one window of which is an active window at the forefront of the stack of application windows for the presently active application program;

displaying a selection window on a display monitor, which selection window is dedicated by the operating system to a permanent active status and dedicated by the operating system to a permanent floating position in front of the active window;

maintaining an availability roster of the application programs which have available status and are available for advancement to active status;

generating activation symbols in response to the availability roster for at least a portion of the available application programs, the generated activation symbols being displayed in the floating selection window on the monitor, which activation symbols are responsive to a user input device;

selecting an available application program using the input device, for advancement from available status to active status through the activation symbols displayed in the floating selection window; and advancing the selected application program to active status at the forefront of the stack of application windows directly behind the floating selection window in response to the input device selection.

* * * * *